United States Patent [19]

Pepper et al.

[11] Patent Number: 5,436,553
[45] Date of Patent: Jul. 25, 1995

[54] OPTICAL POWER CONVERSION

[75] Inventors: Steven H. Pepper; John T. Ebner, both of Portland, Oreg.

[73] Assignee: Tektronix, Inc., Wilsonville, Oreg.

[21] Appl. No.: 125,720

[22] Filed: Sep. 24, 1993

[51] Int. Cl.6 .................................. H04B 10/12
[52] U.S. Cl. .................................. 323/259; 323/901; 323/902; 250/227.11
[58] Field of Search ............... 323/259, 344, 902; 363/41, 101; 250/227.11

[56] References Cited

U.S. PATENT DOCUMENTS

| | | | |
|---|---|---|---|
| 3,430,054 | 2/1969 | Klein | 250/551 |
| 3,952,205 | 4/1976 | Tobey, Jr. et al. | 250/551 |
| 4,075,512 | 2/1978 | Rast, Jr. et al. | 250/551 |
| 4,525,873 | 6/1985 | Baues | 455/600 |
| 4,812,961 | 3/1989 | Essoff et al. | 363/61 |
| 4,857,727 | 8/1989 | Lenz et al. | 250/227 |
| 4,988,942 | 1/1991 | Ekstrand | 323/282 |

FOREIGN PATENT DOCUMENTS 8207020 of 1983 Japan.

*Primary Examiner*—Thomas M. Dougherty
*Assistant Examiner*—Shawn Riley
*Attorney, Agent, or Firm*—John Smith-Hill; John D. Winkelman

[57] ABSTRACT

An optical power conversion circuit converts an optical energy signal from an optical source, such as a laser diode, to a regulated D.C. electrical voltage using a single photodetector. A buck-boost circuit uses electrical current from the photodetector in response to the optical energy signal to store energy in an inductor during one polarity of a control signal, and transfers the energy from the inductor to an output capacitor during the other polarity of the control signal. The duty cycle of the control signal determines the regulated D.C. electrical voltage. A switch drive circuit generates the control signal as a pulse width modulated signal from the regulated D.C. electrical voltage and a reference voltage. The control signal is A.C. coupled to a pair of FET switches in the buck-boost circuit to alternately energize and charge the inductor and capacitor respectively. A switched capacitor is coupled in parallel with the photodetector to store energy from the photodetector when the inductor is transferring energy to the output capacitor. At startup one of the FET switches in the buck-boost circuit is normally closed and the other normally open, and a third FET switch decouples the switched capacitor from the photodetector. A startup modulation signal is generated at the optical source to provide switching action equivalent to that of the FET switches in the buck-boost circuit until the regulated D.C. voltage achieves a sufficient level to energize the switch drive circuit and sustain normal operation. A data pickoff circuit is inserted in series with the photodetector to retrieve a data signal impressed upon the optical energy signal without disturbing the D.C. content.

14 Claims, 2 Drawing Sheets

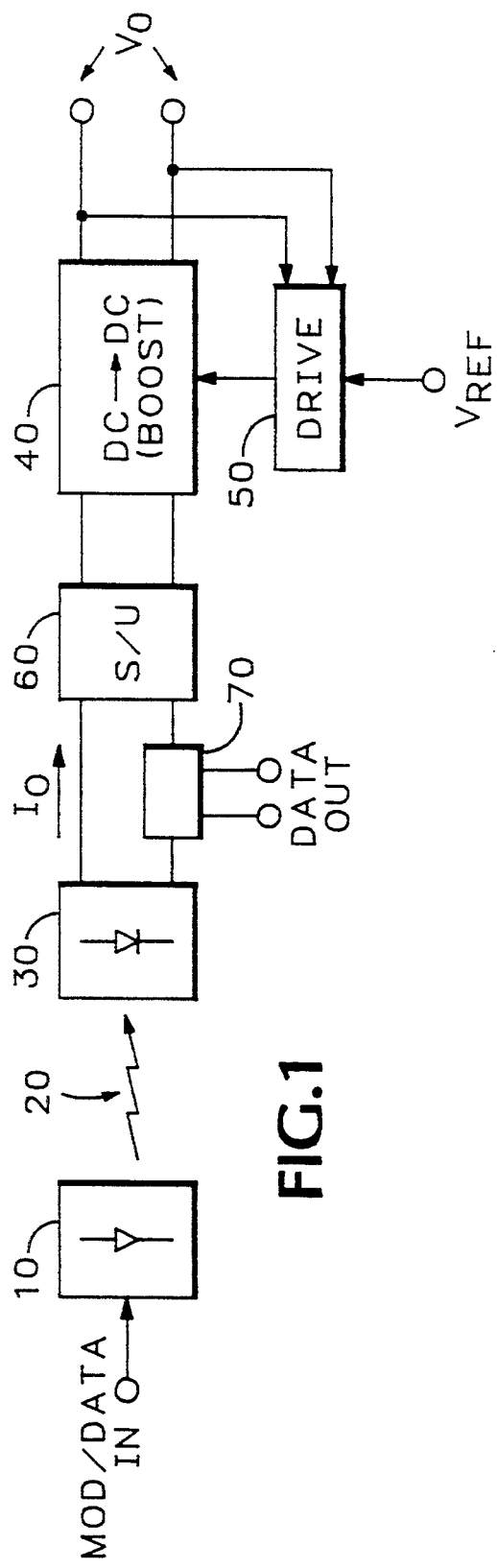
FIG.1
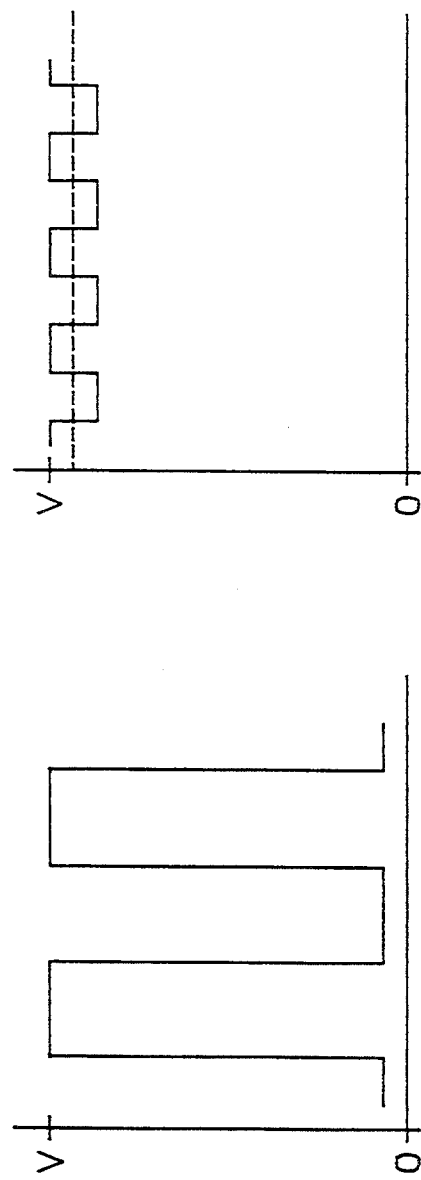
FIG.3A
FIG.3B

OPTICAL POWER CONVERSION

BACKGROUND OF THE INVENTION

The present invention relates to optical power conversion, and more particularly to a means for converting optical power to a regulated direct current (D.C.) voltage using a single photodetector while providing data communications.

In optical power conversion a laser diode commonly is used as a power source for the transmission of optical energy. At the reception end a photodetector is used to convert the optical energy to electrical energy. The transmission medium between the laser diode and photodetector typically is an optical fiber. The voltage generated across the photodetector is slightly less than one volt. Since most electrical circuits need a minimum of 2.5-5.0 volts to operate, a plurality of photodetectors are coupled in series to provide at least a 5.0 volt output. With the photodetectors in series, the photodetector that receives the lowest amount of light sets the current output for all of the photodetectors. Thus the efficiency of energy transfer is less than maximum since it is very difficult to provide uniform illumination for all of the photodetectors.

An alternative type of photodetector is in the form of a circle having a plurality of pie-shaped segments that are coupled in series. This is a very expensive component, but provides a configuration for which it is easier to provide uniform illumination for all segments. However, due to the differences in quantum efficiencies between the segments, the power transfer efficiency is still less than optimum.

What is desired is an optical power conversion means for converting optical energy to electrical energy with optimum power transfer efficiency.

SUMMARY OF THE INVENTION

Accordingly the present invention provides an optical power conversion means that uses a laser diode as a source for transmitting optical energy over an optical fiber, and uses a single photodetector at the reception end to convert the optical energy from the optical fiber to electrical energy. A boost-type direct current (D.C.) power converter is coupled to the photodetector to boost the voltage from the photodetector to desired regulated D.C. levels at the output. A startup circuit, in the form of a switched capacitor, is inserted at the junction between the photodetector and D.C. power converter so that a startup modulation signal from the laser diode starts the operation of the D.C. power converter until the output voltage reaches a value capable of driving the field effect transistors (FETs) in the D.C. power converter. A drive circuit for the FETs compares the voltage output from the D.C. power converter with a reference voltage, and provides a pulse width modulated control signal to the FETs. The reference voltage determines the regulated output voltage, and determines the duty cycle of the control signal as a function of the output voltage. For data communications a low amplitude data signal may be added to the D.C. voltage that biases the laser diode. This data signal may be picked off from the photodetector output by a current sense transformer in the current path of the photodetector. The transformer provides the desired amplification according to the turns ratio of the transformer windings, but does not interfere with the D.C. power transfer between the laser diode and the D.C. power converter.

The objects, advantages and other novel features of the present invention are apparent from the following detailed description when read in conjunction with the appended claims and attached drawing.

BRIEF DESCRIPTION OF THE DRAWING

FIG. 1 is a block diagram of an optical power conversion circuit according to the present invention.

FIG. 3a is a waveform representation of a startup modulation control signal according to the present invention; and FIG. 3b is a waveform representation of a data modulation signal according to the present invention.

DESCRIPTION OF THE PREFERRED EMBODIMENT

Figure 2:
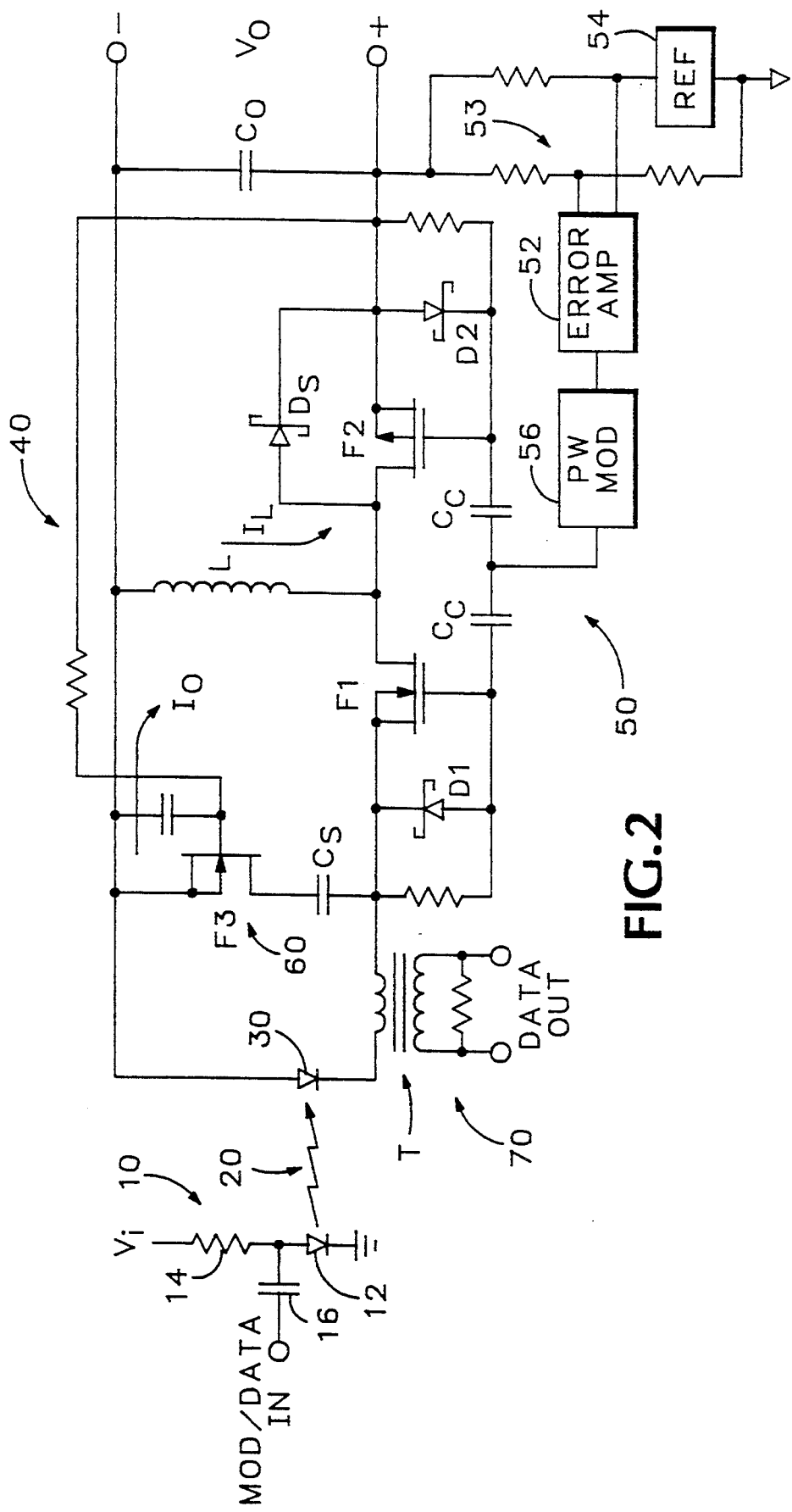
FIG. 2 is a schematic diagram of the optical power conversion circuit of FIG. 1.

Referring now to FIG. 1 an optical power source 10 is shown that transmits optical energy over an optical channel 20, such as an optical fiber. A photodetector 30 at the end of the optical channel 20 converts the optical energy to electrical energy in the form of an electrical current Io. The electrical current Io is input to a D.C. to D.C. switching power converter 40 to convert the electrical current to a desired output voltage Vo. A switch drive circuit 50 is coupled to sense the output voltage Vo and compare it with a reference voltage Vref. The output of the switch drive circuit 50 is a pulse width modulated control signal with a duty cycle that is a function of the comparison. The pulse width modulated control signal controls the switching in the D.C. to D.C. switching power converter 40.

A startup circuit 60 is coupled between the photodetector 30 and the D.C. to D.C. switching power converter 40 to provide switching action to the D.C. to D.C. switching power converter until the output voltage Vo is sufficient to power the switch drive circuit 50. Also a data pickoff circuit 70 is coupled in series with the output current to generated by the photodetector 30 to detect any data modulation superimposed upon the optical energy transmitted by the optical power source 10.

As shown in FIG. 2 the optical power source 10 has a laser diode 12 coupled between a pair of voltage rails via a resistor 14. The voltage rails are generally ground and a voltage Vi that, together with the resistor 14, assures that the laser diode operates at the optimum power level. The startup modulation signal and the data signal are input to the laser diode 12 via a capacitor 16 to produce modulation in the optical energy emitted by the laser diode. The optical energy travels through the optical channel 20 to the photodetector 30, where it is converted to the output current Io.

The D.C. to D.C. switching power converter 40 shown is in the form of a buck-boost circuit. A first FET switch F1 couples the output current Io to an inductor L that is in parallel with the photodetector 30. A second FET switch F2 couples current $I_L$ from the inductor L to an output capacitor Co when the first FET switch F1 decouples the inductor from the photodetector 30. The output capacitor Co is in parallel with the inductor L. The two FET switches F1, F2 operate in opposition, i.e., while one is open the other is closed. In operation the current Io from the photodetector 30 charges the inductor L while the first FET switch F1 conducts, the second FET switch F2 being open. Then when the second FET switch F2 closes and conducts, the first FET switch F1 opens and the current $I_L$ in the inductor L continues to flow to charge the output capacitor Co. The relative times of conduction of the two FET switches F1, F2 determine the resulting voltage stored on the output capacitor Co.

The switch drive circuit 50 includes a pulse width modulator 52 that senses the output voltage Vo and compares it with the reference voltage Vref to produce the pulse width modulated control signal, as is well known in the art. The pulse width modulated control signal is input to the junction between a pair of coupling capacitors Cc. The other sides of the coupling capacitors Cc are coupled to the respective gates of the FET switches F1, F2. Coupled between the gate of the first FET switch F1 and the photodetector 30 is a first diode D1. Also coupled between the gate of the second FET switch F2 and the output capacitor Co is a second diode D2 of reversed polarity. The coupling capacitors Cc remove the D.C. component from the pulse width modulated control signal so that first one and then the other of the FET switches F1, F2 is turned on according to the relative polarity of the control signal.

The startup circuit 60 has a switched capacitor Cs in series with a third FET switch F3 across the photodetector 30. Initially there is no current flowing in the inductor L and no voltage charge on the output capacitor Co. With no voltage across the output capacitor Co the switch drive circuit 50 cannot generate the pulse width modulated control signal. The third FET switch F3 is normally closed during operation to provide a temporary storage for energy from the photodetector 30 while the energy from the inductor L is being transferred to the output capacitor Co during normal operation. However at startup the third FET switch F3 is open to decouple the switched capacitor Cs from across the photodetector 30. A startup modulation signal, as shown in FIG. 3a, is applied to the laser diode 12 so that it swings between full on and full off. Since the FET switches F1, F2 are biased normally closed and open, respectively, when the laser diode 12 emits optical energy during one polarity of the startup modulation signal, the output current Io flows through the inductor L. When the laser diode 12 stops emitting optical energy during the other polarity of the startup modulation signal, the inductor current $I_L$ flows into the output capacitor Co through a startup diode Ds. The startup modulation signal provides the initial switching action for the D.C. to D.C. switching power converter 40 in lieu of the FET switches F1, F2. Once the output voltage Vo reaches a sufficient voltage to energize the switch drive circuit 50, the FET switches Fl, F2 start to operate normally, the startup modulation signal is discontinued, and the third FET switch F3 returns to the normally closed position.

The switch drive circuit 50 has an error amplifier 52 having one input coupled to the positive output of the DC switching power converter 40 via a voltage divider network 53. The other input of the error amplifier 52 is coupled to a voltage reference device 54 that is powered by the positive output also. During startup the reference voltage is the same as the output voltage until the output voltage exceeds the reference voltage determined by the voltage reference device 54, which may be a Zener diode. Once the output voltage exceeds the reference voltage, the reference voltage remains constant and the error amplifier 52 provides an error voltage output. The error voltage output is input to a pulse-width modulator 56 that converts the error voltage output level into a pulsed control signal, with the pulse width being a function of the error voltage output level. The parameters of the pulsewidth modulator 56 are determined by the desired output voltage Vo.

The data pickoff circuit 70 may be in the form of a current sense transformer T. The winding turns of the transformer T are determined by the desired current amplification required for the data signal, as shown in FIG. 3b, that is added to the optical energy transmitted from the optical source 10. A small number of turns is used for the primary winding coupled in series with the output current Io, and a large number of turns is used in the secondary winding to provide the data output signal. The use of the current sense transformer T as the data pick circuit 70 assures that the entire D.C. energy from the photodetector 30 goes to the D.C. power converter 40.

For optimum efficiency the laser diode 12 and the photodetector 30 should be matched in wavelength. The basic circuit of the present invention is the optical energy source 10 optically coupled to the photodetector 30 which in turn is coupled to a boost circuit 40 to provide the desired regulated D.C. voltage output. The second FET F2 may be replaced with a diode of appropriate polarity so that only the first FET F1 is driven with the pulse width modulated control signal. When the second FET F2 is incorporated into the circuit, then the switch drive circuit 50 as shown is used. An alternative to the present startup circuit 60 would be to have additional photodetectors switched in series with the operating photodetector 30, the additional photodetectors in series providing the voltage sufficient to energize the switch drive circuit 50 without the requirement of the startup modulation signal. Once the switch drive circuit 50 is operating to control the D.C. to D.C. power converter 40, then the third FET F3 may be used to short across the extra photodetectors to return to the operational state. Finally the data pickoff circuit 70 is added where data transmission from the optical source 10 to the receiver is desired.

Thus the present invention provides optical power conversion using a single photodetector in conjunction with a D.C. to D.C. power converter for boosting the voltage across the photodetector to the desired output regulated D.C. voltage. Additional circuitry may be added to provide for efficient drive of the FET switches in the D.C. to D.C. power converter, to provide a startup mechanism from a quiescent state, and to provide for data pickoff.

What is claimed is:

1. An optical power conversion circuit for providing a regulated D.C. output voltage from an optical energy signal, comprising:
    a single photodetector for converting the optical energy signal to a D.C. electrical signal; and
    a startup and boosting means coupled to the photodetector, the startup and boosting means being responsive to a startup modulation component within the optical energy signal when the circuit is in a quiescent state for boosting the D.C. electrical signal to the regulated D.C. output voltage and bringing the circuit into an operational state, in which the startup and boosting means sustains the regulated D.C. output voltage upon removal of the startup modulation component.

2. A circuit according to claim 1, wherein the startup and boosting means comprises a series combination of an inductor and a switch coupled in parallel with the photodetector, and a series combination of a capacitor and a unidirectionally conductive means coupled in parallel with the inductor, whereby when the switch is closed, current flows through the inductor and the photodetector, whereas when the switch is open, current flows through the inductor and the unidirectionally conductive means to charge the capacitor.

3. A circuit according to claim 2, further comprising a switch driving means for driving the switch alternately to a closed state and an open state, the switch driving means being operated in response to the regulated D.C. output voltage.

4. A circuit according to claim 1, wherein the startup and boosting means comprises a series combination of an inductor and a first switch coupled in parallel with the photodetector, and a series combination of a capacitor and a second switch coupled in parallel with the inductor, whereby when the first switch is closed, current flows through the inductor and the photodetector, whereas when the first switch is open and the second switch is closed, current flows through the inductor and the second switch to charge the capacitor.

5. A circuit according to claim 4, wherein the circuit further comprises a switch driving means for driving the first and second switches in opposition, the switch driving means being operated in response to the regulated D.C. output voltage.

6. A circuit according to claim 5, wherein the switch driving means comprises a means for generating a pulse width modulated control signal as a function of the output voltage and a reference voltage, and a means for A.C. coupling the pulse width modulated control signal to the first and second switches.

7. A circuit according to claim 1, wherein the startup and boosting means comprises a series combination of an inductor and a first switch coupled in parallel with the photodetector, a series combination of a first capacitor and a second switch coupled in parallel with the inductor, and a switch driving means operated in response to the regulated D.C. output voltage for driving the first and second switches in opposition, whereby when the first switch is closed, current flows through the inductor and the photodetector, whereas when the first switch is open and the second switch is closed, current flows through the inductor and the second switch to charge the first capacitor, and wherein the switch driving means comprises a means for generating a pulse width modulated control signal as a function of the regulated D.C. output voltage and a reference voltage, and a means for A.C. coupling the pulse width modulated control signal to the first and second switches, and the A.C. coupling means comprises a second capacitor coupled between the generating means and a control terminal of the first switch, a first diode coupled between the control terminal of the first switch and the photodetector, a third capacitor coupled between the generating means and a control terminal of the second switch, and a second diode coupled between the control terminal of the second switch and the first capacitor.

8. A circuit according to claim 4, wherein the first switch is biased to a closed condition and the circuit further comprises a unidirectionally conductive means connected in parallel with the second switch.

9. A circuit according to claim 1, further comprising a series combination of a capacitor and a switch coupled in parallel with the photodiode, the switch being biased to an open condition, and a means responsive to the regulated D.C. voltage for closing the switch.

10. A circuit according to claim 1, further comprising a picking off means coupled in series with the photodetector for picking off a data component from the D.C. electrical signal.

11. A circuit according to claim 10, wherein the picking off means comprises a primary winding of a current sense transformer, the current sense transformer also having a secondary winding that provides the picked off data component.

12. A method of operating an apparatus comprising a light emitting diode, a single photodetector, and a transmission medium for propagating light emitted by the light emitting diode to the photodetector, said method comprising:

energizing the light emitting diode, whereby the light emitting diode emits an optical energy signal and the optical energy signal is propagated by the transmission medium to said photodetector and the photodetector generates an electrical current, during a start up interval, modulating the energization of the light emitting diode alternatingly between a first state, in which the photodetector supplies current to an inductor, and a second state, in which the photodetector does not supply current and the current in the inductor charges a capacitor, whereby the capacitor is charged to a regulated D.C. output voltage, and during an operational interval, energizing the light emitting diode so that the photodetector remains continuously illuminated and periodically disconnecting the photodetector from the inductor and allowing current in the inductor to maintain the capacitor charged to the regulated D.C. output voltage.

13. A method according to claim 12, comprising modulating the energization of the light emitting diode during the operational interval with a data signal, whereby the electrical current generated by the photodetector during the operational interval has a data component, and picking off the data component.

14. A method according to claim 12, comprising employing power at the regulated D.C. output voltage to control the periodic disconnection of the photodetector from the inductor.

* * * * *